United States Patent [19]

Witt

[11] Patent Number: 4,484,568
[45] Date of Patent: Nov. 27, 1984

[54] OVERHEAT EMERGENCY OUTFOCUS MECHANISM FOR SOLAR ENERGY COLLECTOR

[75] Inventor: John D. Witt, Mesquite, Tex.

[73] Assignee: Solar Kinetics, Inc., Dallas, Tex.

[21] Appl. No.: 297,553

[22] Filed: Aug. 31, 1981

[51] Int. Cl.³ .............................................. F24J 3/02
[52] U.S. Cl. .................................... 126/438; 126/422
[58] Field of Search ............... 126/438, 418, 422, 419; 254/11, 13, 89 H, 92, 93 H; 169/57; 137/68 R, 72, 73

[56] References Cited

U.S. PATENT DOCUMENTS

| | | | |
|---|---|---|---|
| 2,508,240 | 5/1950 | Fenn | 254/89 H |
| 2,684,129 | 7/1954 | Jaseph | 254/89 H |
| 2,921,772 | 1/1960 | Boyd | 254/13 |
| 4,004,574 | 1/1977 | Barr | 126/438 |
| 4,138,994 | 2/1979 | Shipley, Jr. | 126/438 |
| 4,173,968 | 11/1979 | Steward | 126/438 |
| 4,226,225 | 10/1980 | Niedermeyer | 126/422 |
| 4,309,984 | 1/1982 | Dorbeck | 126/438 |
| 4,318,394 | 3/1982 | Alexander | 126/424 |
| 4,365,616 | 12/1982 | Vandenberg | 126/438 |

Primary Examiner—Samuel Scott
Assistant Examiner—Noah Kamen
Attorney, Agent, or Firm—John F. Booth; Gerald G. Crutsinger; Monty L. Ross

[57] ABSTRACT

A control means for a solar energy collector-concentrator of the focusing trough reflector type with an energy receiver operatively positioned at the line of focus of said reflector comprising pivotally mounted support means for said energy receiver held in a receiver-operative position by linkage including a thermally fusible link against spring operative means biasing said support means to a receiver non-operative position out of said line of focus.

3 Claims, 3 Drawing Figures

4,484,568

OVERHEAT EMERGENCY OUTFOCUS MECHANISM FOR SOLAR ENERGY COLLECTOR

BACKGROUND AND BRIEF SUMMARY OF INVENTION

This invention relates to focusing reflector trough type solar energy collectors and more particularly to a focusing reflector trough type solar energy collector having an emergency outfocus mechanism immediately operable upon the detection of overheating likely to cause damage to the energy receiver or utilization devices of the collector.

Various types of devices are used to collect solar energy for immediate use or for storage and future use, often after conversion to a different type of energy. Some types of collectors provide low concentration energy to large area receivers or utilization devices. Other types provide high concentration energy to relatively small area receivers or utiliation devices through reflective or refractive focusing of the incoming solar radiation.

One type of concentrator-collector is the parabolic trough collector. This type of collector uses an elongated reflective trough having a parabolic cross-section to concentrate received solar radiation at the line of focus of the parabolic surface. Receivers such as energy converters, solar cells, material treatment chambers or other types of utilization devices are placed along the line of focus to receive the highly concentrated solar energy. Occasionally, equipment malfunction may produce excessive heating of the receiver which, if not quickly corrected, may result in serious damage to the receiver. In many prior art collectors overheating is avoided by reorienting the reflector so that it no longer receives the solar radiation directly. Since the reflectors are ordinarily rather massive, inordinately expensive mechanisms are required to reorient the reflector quickly enough after overheating has been detected to insure the prevention of damage.

By the present invention, the energy receiver of a reflective trough type collector-concentrator is mounted at the line of focus of the reflective trough by "collapsible" structure in order that the receiver may be quickly removed from the high energy concentration area at the focus when overheating is sensed without the necessity of reorienting the entire mass of the reflector.

If the receiver is caused to move relative to the line of focus by an amount proportional to a sensed condition of the receiver, that condition, temperature for example, can be controlled using the present invention.

It is an object then, of the present invention to provide a solar energy collector-concentrator having means to prevent receiver damage from overheating resulting from equipment malfunction.

It is a further object to provide a solar energy collector-concentrator wherein the energy receiver is supported at the line of focus of the reflector by collapsible structure in order that the receiver may be quickly deactivated by removal from the area of concentrated energy immediately upon detection of overheating.

It is a still further object to provide a solar energy collector-concentrator wherein the energy receiver may be quickly removed from the high energy concentration region without the necessity of moving the entire reflector mass.

It is an even further object of the present invention to provide a condition controlling mechanism for solar energy collector-concentrators.

BRIEF DESCRIPTION OF THE DRAWINGS

These and other objects and advantages of this invention will become apparent from the following detailed description when read with reference to the accompanying drawings wherein.

DETAILED DESCRIPTION OF THE INVENTION

Figure 1:
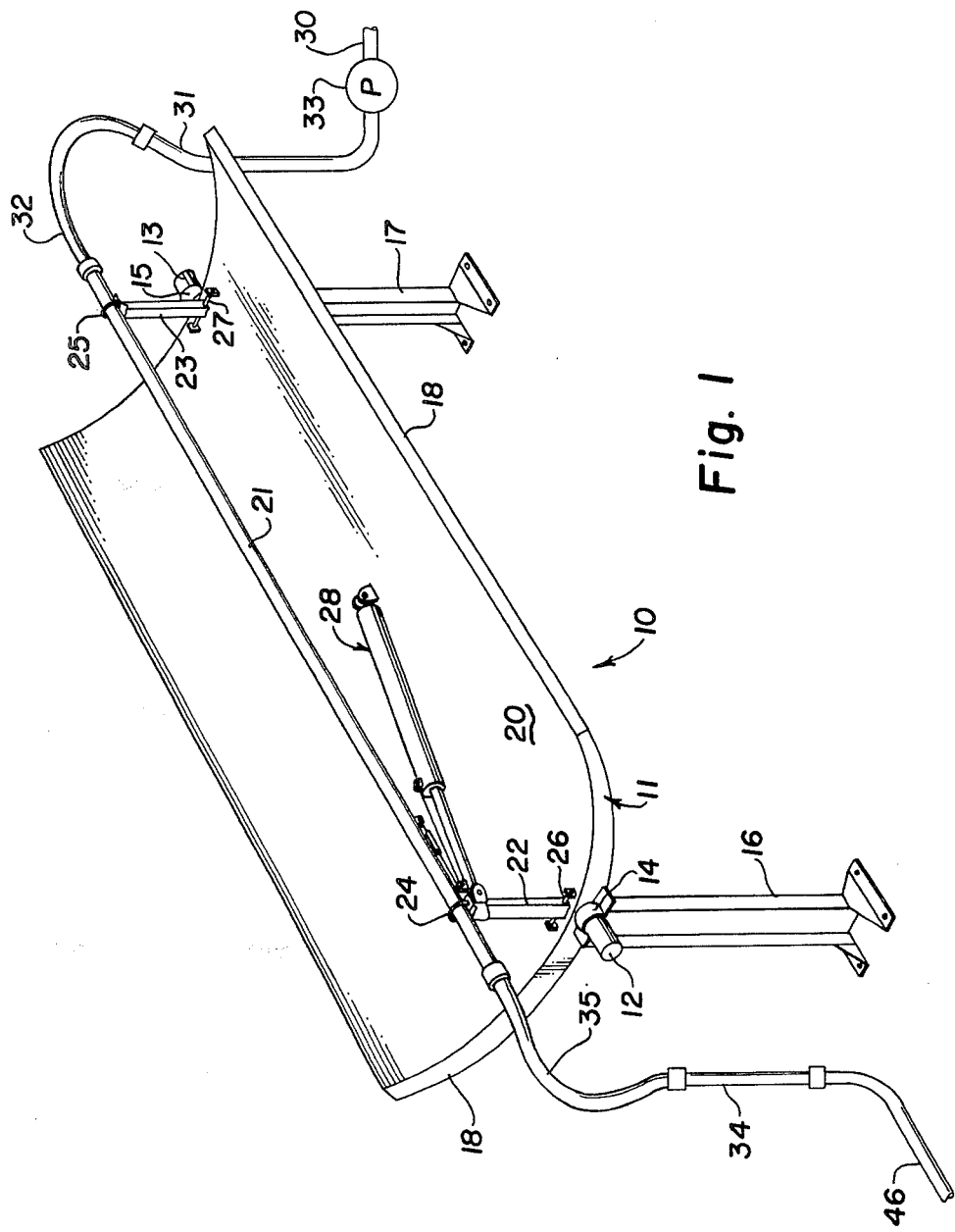
FIG. 1 is a perspective view, partially schematic, of a parabolic trough type solar energy collector-concentrator incorporating the emergency outfocus mechanism of the present invention.

Referring now to the drawings, FIG. 1 schematically depicts a parabolic trough type solar energy collector-concentrator designated generally as 10 wherein a reflector element 11 is mounted for rotational movement about a horizontal axis defined by mounting shafts 12 and 13 journaled in bearings 14 and 15 of mounting pylons 16 and 17. The mounting pylons 16 and 17 are anchored to the ground or other suitable base structure. Through movement about its horizontal axis the reflector element 11 may be oriented to receive maximum solar radiation at all times. Reflector element 11 may comprise support structure 18, which may be either solid or framework, holding a reflective surface 20 configured in a trough like shape of parabolic cross-section. Thus, when the reflector is pointed toward the sun, solar radiation impinging on any part of the surface 20 is reflected to converge at the line of focus of that parabolic surface. Utilization devices, which may be, for example, solar cells or a thermal treatment chamber such as receiver tube 21, are supported in the line of focus area of the collector such as by support struts 22 and 23 and thus receive the concentrated radiation.

In the example shown, receiver 21 is hollow and adopted to act as a thermal treatment or reaction chamber for material being moved continuously therethrough. Heat is supplied by the solar radiation concentrated on the receiver 21 by the receiver 11. Material for treatment in receiver 21 is drawn from a source, not shown, through supply line 30. The material to be treated is then moved through tubing 31, of which at least a portion 32 is flexible as, for example, by pump 33 into and through receiver 21 for thermal treatment or reaction therein. The treated material emerges from receiver 21 through tubing 34, at least a part 35 of which is flexible, and moved through line 46 to storage or elsewhere for additional treatment.

Should the material feed equipment malfunction or should overheating of the receiver occur for some other reason, it is necessary to quickly remove the energy input from the receiver 21. Unlike the prior art wherein it is common to reorient the entire reflector assembly 11 away from the energy source (sun) to stop energy input, by the present invention the receiver tube is merely removed from the area of the line of focus of the reflector i.e., the area of energy concentration.

Thus, in a preferred embodiment of the present invention receiver tube 21 is collapsibly held by support struts 22 and 23 through their pivotal connection to tube clamps 24 and 25. The lower ends of support struts 22 and 23 are pivotally connected to the reflector 11 at 26 and 27, respectively. Outfocus actuator control mechanism 28 connected between one of the support struts 22 and reflector 11 is used to position strut 22 and thus to position receiver 21 and support strut 23, both linked to strut 22. In the embodiment shown when strut 22 is held in a vertical position, receiver 21 is positioned along the line of focus of the reflector 11 so as to receive maximum solar energy. Longitudinal movement of the strut 22 in either direction to an inclined or essentially horizontal position lowers receiver 21 from the focus position. In the lowered or "outfocus" position, receiver 21 receives only a minor amount of direct and reflected solar energy which is not concentrated and thus essentially all of the heat input to the treatment chamber is stopped. The flexible portions 32 and 35 of the material supply and removal system allow the above described movement of the treatment chamber without the necessity of disconnecting or interrupting the material conduit.

Actuator mechanism 28 may take a number of different forms. In the form shown in FIG. 2, mechanism 28 comprises a ram member 36 slideably engaged in tubular housing 37 which contains a compression spring 38 bearing against the end of ram 36. Housing 37 is pivotally connected to reflector 11 at 47. The other end of ram 36 is connected to support strut 22 by pivot joint 40. A cable means 41 connected to housing 37 by tab plate 42 extends around pulley 43 on ram 36 and is anchored through fusible link 44 to tab plate 45 on receiver 21. Cable 41 is of such length that support strut 22 is held in a vertical position by actuator 28. Thus receiver 21 is held in the normal operative position at the line of focus of the reflector 11. If, for some reason, the receiver tube 21 becomes overheated, link 44 fuses and releases cable 41. Spring 38 then pushes ram 36 to its full extension so that the support struts and receiver 21 are positioned as shown in FIG. 3 with receiver 21 removed from the concentrated energy at line of focus 48. The difference between the focused and the unfocused positions of the receiver is of a set magnitude.

Figure 2:
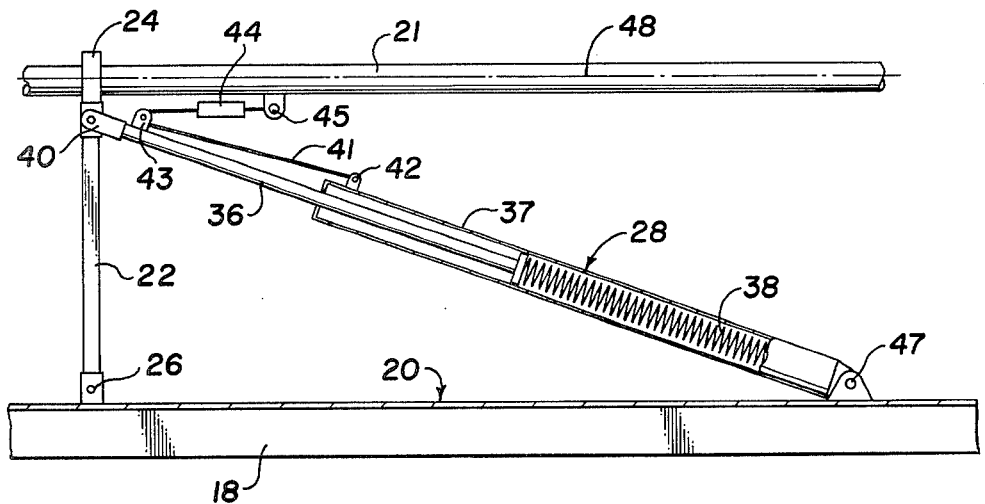
FIG. 2 is a side view schematic illustration of one embodiment of the emergency outfocus mechanism of the present invention in position for normal operation of the solar energy collector.
Figure 3:
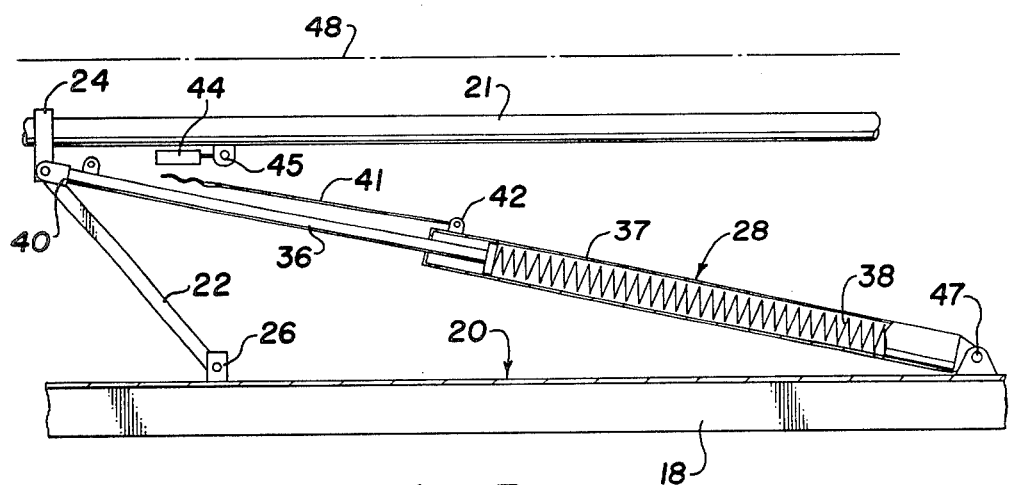
FIG. 3 is a side view schematic illustration of the emergency outfocus mechanism of FIG. 2 having moved to the outfocus position in response to an overheat indication at the receiver tube of the collector.

The actuator mechanism 28, of course, may take different forms from that shown in FIGS. 2 and 3. It may, for example, comprise a hydraulically or pneumatically actuated piston and cylinder structure with electrical, electronic or mechanical overheat sensors arranged to control a pump supplying operating fluid to the actuator. Or it may take the form of a motor-driven jackscrew mechanism or any other suitable linear actuator.

Nor is movement of the receiver 21 in the manner shown the only way contemplated to accomplish the purpose of this invention since emergency outfocus operation may be achieved as well by movement of the receiver 21 either above or to the side of the line of focus. For example, the pivot axes of each of the support struts 22 and 23 may be oriented at 90° from that shown for latitudinal movement with the actuator 28 appropriately connected to the edge of the reflector. In still a different embodiment actuator mechanisms may be incorporated into the support struts 22 and 23 which would then be rigidly rather than pivotally connected to reflector 11 and the receiver 21 the actuator comprising fluid actuated piston and cylinder mechanisms jackscrews or other mechanisms operative to raise or lower the receiver tube in a vertical plane out of the line of focus upon detection of an overheated condition.

Of course, useful operation of the present invention is not necessarily dependent on total removal from the line of focus of the treatment chamber or any other utilization device. For example, indications from temperature or other sensors of a receiver condition may be used for a continuous adjustment of receiver position relative to the line of focus in order to maintain a desired steady or programmed heating of the receiver or other energy utilization output from the collector-concentrator.

Having described the solar energy collector thermal control and overheat safeguard mechanism of the present invention many changes and modifications still within the scope and spirit of the teachings herein will occur to those skilled in the art and thus it is intended that this invention be limited only as set forth in the following claims.

What is claimed is:

1. A solar energy collector-converter of the focusing trough reflector type wherein said trough is rotatable about a horizontal axis and an energy receiver is mounted at the line of focus of said trough reflector comprising: means positioning the energy receiver at said line of focus, fusible link overheat sensor, means providing an output indicative of a condition of said receiver at said line of focus, fusible link overheat sensor, means providing an output indicative of a condition of said receiver and spring operated mechanical control means responsive to said output to change the position of said receiver relative to said line of focus by a set magnitude whereby the amount of focused solar energy applied to said receiver may be varied according to said condition.

2. A solar energy collector-converter of the focusing trough reflector type wherein an energy receiver is mounted at the line of focus of said trough reflector including pivotally mounted support means positioning the energy receiver at said line of focus, spring means biasing said support means to a position with said receiver removed from said line of focus and restraining means including a fusible link operative to hold said support means positioned with said receiver at said line of focus against the bias of said spring means, said fusible link being so positioned as to rupture upon the occurrence of a overheat condition in said receiver whereby said receiver is removed from said line of focus upon the occurrence of an overheat condition.

3. A solar energy collector-converter of the focusing trough reflector type wherein an energy receiver is mounted at the line of focus of said trough reflector including at least two support means positioning the energy receiver at said line of focus, said support means each being pivotally connected to said receiver and to said trough reflector, means biasing said support means to a position with said receiver removed from said line of focus, restraining means operative to hold said support means positioned with said receiver at the said line of focus against the bias of said means biasing, means providing an output indicative of a condition of said receiver and control means responsive to said output to deactivate said restraining means whereby said biasing means urges pivotal movement of said support means to move said receiver from said line of focus.

* * * * *

UNITED STATES PATENT AND TRADEMARK OFFICE
CERTIFICATE OF CORRECTION

PATENT NO. : 4,484,568
DATED : November 27, 1984
INVENTOR(S) : John D. Witt

It is certified that error appears in the above-identified patent and that said Letters Patent is hereby corrected as shown below:

In Column 4, Claim 1, lines 30 through 32, after "receiver", delete -- at said line of focus, fusible link overheat sensor, means providing an output indicative of a condition of said receiver --.

Signed and Sealed this

Twenty-third Day of April 1985

[SEAL]

Attest:

DONALD J. QUIGG

Attesting Officer    Acting Commissioner of Patents and Trademarks